United States Patent
Levit

(10) Patent No.: US 6,592,963 B1
(45) Date of Patent: Jul. 15, 2003

(54) HONEYCOMB STRUCTURE

(75) Inventor: Mikhail R. Levit, Richmond, VA (US)

(73) Assignee: E. I. du Pont de Nemours and Company, Wilmington, DE (US)

( * ) Notice: Subject to any disclaimer, the term of this patent is extended or adjusted under 35 U.S.C. 154(b) by 221 days.

(21) Appl. No.: 09/595,740

(22) Filed: Jun. 16, 2000

(51) Int. Cl.[7] .............................................. B32B 3/12
(52) U.S. Cl. ..................... 428/116; 428/12; 428/535; 428/537.5; 428/593; 156/290; 156/291; 156/197
(58) Field of Search ................. 428/116, 118, 428/12, 117, 532, 533, 534, 535, 537.5, 593; 156/60, 197, 290, 291

(56) References Cited

U.S. PATENT DOCUMENTS

| | | | |
|---|---|---|---|
| 3,184,365 A | 5/1965 | Rule | 156/548 |
| 3,493,450 A | 2/1970 | Judge, Jr. | 156/197 |
| 3,979,252 A | 9/1976 | Hoyt | 156/512 |
| 4,290,837 A | 9/1981 | Bova | |
| 4,677,013 A * | 6/1987 | Anderson | |
| 5,277,732 A | 1/1994 | Meier | 156/197 |
| 5,334,276 A | 8/1994 | Meier | 156/364 |
| 5,498,462 A * | 3/1996 | Darfler | |
| 5,670,001 A | 9/1997 | Huebner et al. | 156/197 |
| 5,792,295 A | 8/1998 | Huebner et al. | 156/197 |

FOREIGN PATENT DOCUMENTS

| | | |
|---|---|---|
| CH | 343 803 A | 12/1959 |
| GB | 876 220 A | 8/1961 |

* cited by examiner

*Primary Examiner*—Deborah Jones
*Assistant Examiner*—Wendy Boss

(57) ABSTRACT

The present invention relates to honeycomb structures having cell walls of increased thickness wherein multiple layers of cell wall material are not bonded together except on two opposite cell wall sides. The invention also includes a process for making such honeycomb structures.

11 Claims, 2 Drawing Sheets

HONEYCOMB STRUCTURE

BACKGROUND OF THE INVENTION

1. Field of the Invention

Honeycomb structures are generally made either by assembling corrugated parts or by expanding a stack of flat sheets that have been adhered together in particular configurations. In the past, heavy honeycomb structures have been made using the corrugated parts because of the greater forces that are required to expand heavy or thick flat sheets into honeycomb structures. This invention relates to heavy honeycomb structures made by expanding a stack of flat sheets.

2. Description of Related Art

U.S. Pat. No. 3,493,450, issued Feb. 3, 1970 on the application of D. G. Judge, discloses a comparison of corrugated and expanded honeycomb manufacture and describes a process of expanded honeycomb manufacture in detail.

U.S. Pat. No. 3,184,365, issued May 18, 1965 on the application of E. L. Rule, discloses a process and apparatus for printing, cutting, and stacking in exact registry, identical sheets of collapsed honeycomb laminate.

U.S. Pat. Nos. 5,670,001 and 5,792,295, issued Sep. 23, 1997 and Aug. 11, 1998 on the applications of F. Huebner et al., disclose processes and apparatuses for making collapsed honeycomb that is easier to expand by avoidance of early impregnation of the honeycomb layers.

BRIEF SUMMARY OF THE INVENTION

This invention relates to a honeycomb structure having a multitude of collapsed honeycomb cells with each cell having six cell walls of substantially equal cell wall length and each cell wall comprising at least two layers of sheet material wherein the sheet material of all of the layers of two opposite walls of each cell are bonded to each other and to walls of other cells and none of the layers of the remaining four walls of each cell are adhered together or to walls of other cells. It also relates to a process for making such a honeycomb structure comprising the steps of: (a) applying lines of bonding agent to one layer of sheet material such that the lines are parallel with a finished structure length of one cell wall length and are spaced apart with a finished structure length of one cell wall length between lines of bonding agent; (b) placing a layer of sheet material on the sheet material of step (a); (c) applying lines of bonding agent to the layer of step (b) such that the lines are parallel with a finished structure length of one cell wall length, are spaced apart with a finished structure length of three cell wall lengths between lines of bonding agent, and are located directly coincident with lines of bonding agent on the sheet material of step (a); (d) placing a layer of sheet material on the sheet material of step (c); (e) applying lines of bonding agent to the layer of step (d) such that the lines are parallel with a finished structure length of one cell wall length, are spaced apart with a finished structure length of one cell wall length between lines of bonding agent, and, at least some, are located directly coincident with lines of bonding agent on the sheet material of step (c).

DETAILED DESCRIPTION OF THE INVENTION

Honeycomb structures are made, as stated, by a process using corrugated component parts adhered together and by processes using stacks of flexible sheet materials that are expanded to yield a honeycomb configuration. By far, the easiest honeycomb process is the expanded sheet process, however, a limitation on the thickness of the honeycomb cell wall has been one serious drawback. To make honeycomb from a stack of sheets, the stack must be expanded and expansion is accomplished by pulling the face layers of the stack apart. If the sheets in the stack are too thick or too stiff, the stack cannot be expanded and the honeycomb cannot be formed.

A sense of the force required to expand a stack of sheets can be obtained by a consideration of the bending moment of a sheet wherein: M=bending moment; r=radius of curvature for the bending; E=modulus of elasticity for the sheet material; b=the width of the sheet (thickness of the resultant honeycomb); and h=thickness of the sheet.

$$M=r(Ebh^3)/12$$

For a given honeycomb cell size and a given sheet material, the bending moment increases with the third power of the sheet thickness—very small increases in thickness quickly lead to large increases in bending moment. When sheet materials are laminated together to increase the strength of a resulting honeycomb, the bending moment is not only increased by the cube of the sheet thickness, it is increased, also, by the stiffness incorporated due to the adhesive or bonding agent used to hold the laminated sheets together.

The inventor herein has discovered that honeycomb can be made using at least two layers of sheet material in the cell walls but maintaining those layers as substantially independent of each other without laminating them at the points where they are bent to make cell walls. By maintaining independent sheets, the bending moment is only increased proportionate to the number of layers and not increased by the third power of the number of those layers. This configuration permits expansion of a honeycomb structure with much less force than would be required to expand a structure of the same weight using thicker sheet material.

The sheets are not entirely independent. The sheets are bonded together at the sites of two opposite cell walls in each honeycomb cell; but the sheets are not joined at all at the sites of any of the other four cell walls. There may, also, be some friction among the sheets as they are formed into cells.

Figure 1A:
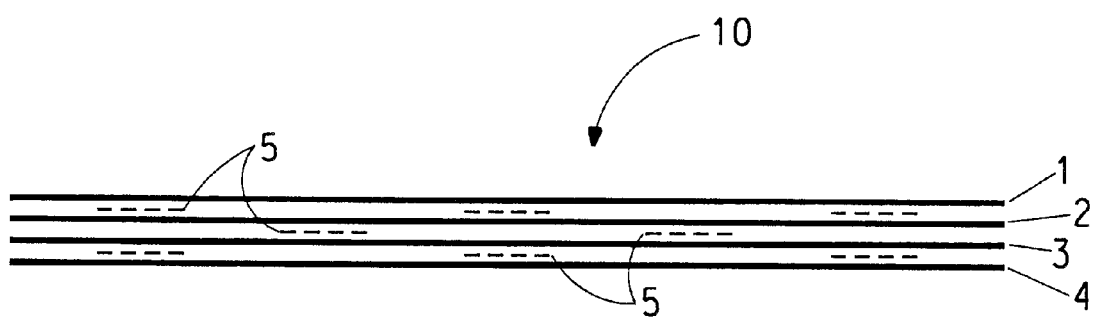
FIG. 1a is a schematic representation of sheet layers of a prior art collapsed honeycomb.
Figure 1B:
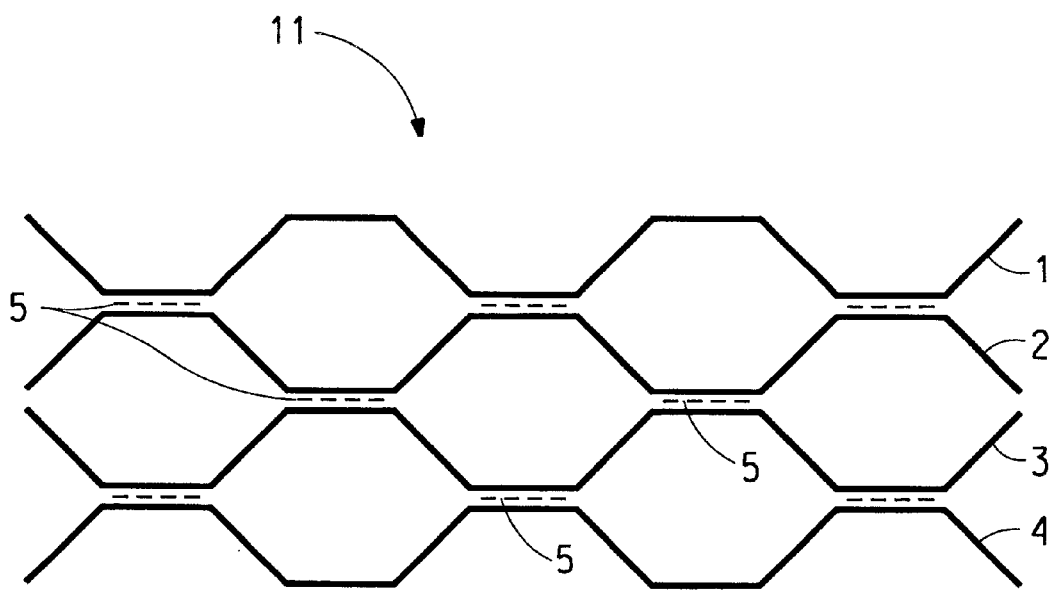
FIG. 1b is a schematic representation of that prior art honeycomb in its expanded form.

Referring to the drawings, FIGS. 1a and 1b depict a typical honeycomb construction of the prior art. Collapsed stack 10 includes sheets 1, 2, 3, and 4 with carefully spaced lines of bonding agent 5 located between the sheets in a way such that, when sheets 1 and 4 are pulled apart, collapsed stack 10 is expanded into honeycomb structure 11.

Figure 2A:
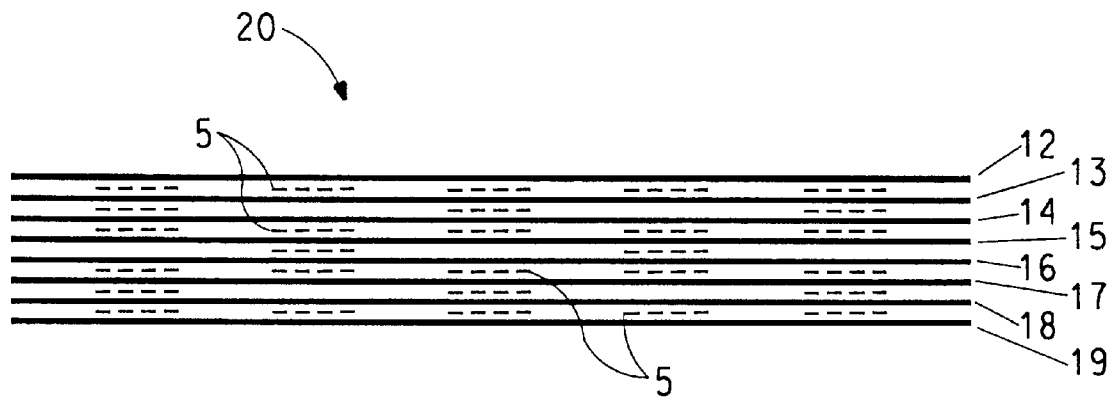
FIG. 2a is a schematic representation of sheet layers of the honeycomb of this invention.
Figure 2B:
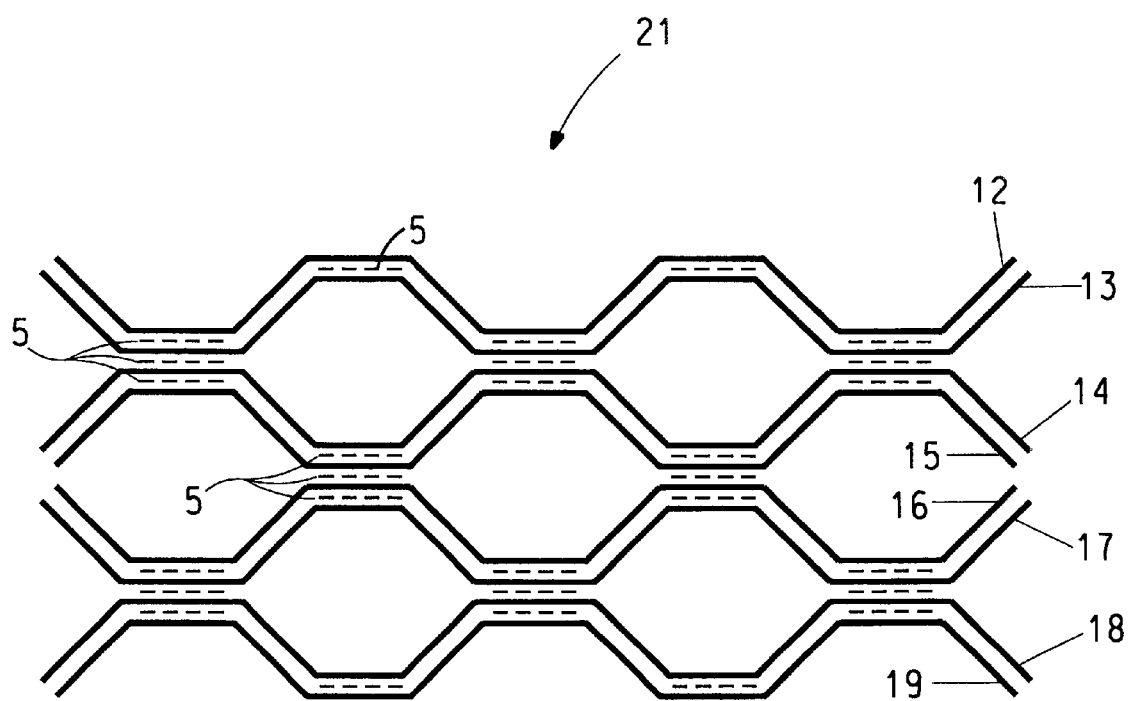
FIG. 2b is a schematic representation of that honeycomb in expanded form.

FIGS. 2a and 2b depict a two-layer honeycomb construction of this invention. Collapsed stack 20 includes sheets 12 through 19 with carefully spaced lines of bonding agent 5 located between the sheets as with the construction in FIGS. 1a and 1b to make expanded honeycomb structure 21 when sheets 12 and 19 are pulled apart. Inspection of collapsed stack 20 reveals that pairs of sheets 12 and 13, 14 and 15, 16 and 17, and 18 and 19 are bonded together to yield honeycomb cell walls having a double thickness. Bonding agent 5 is not present, however, at bending points in the construction when the honeycomb is expanded; and the lack of bonding agent permits bending the double walls with much less force than if the double walls were completely bonded together or were a single wall of double thickness. It is important that lines of bonding agent 5 are applied to the sheets in an amount that will result in a finished structure length of one cell wall.

The cells of the honeycomb of this invention have six walls and the bonding agent is applied such that two opposite walls in each cell are bonded to the layers making up that cell and to other layers of adjacent cells, while no bonding agent is applied to the layers at any of the other four walls in the cells.

When it is stated that the bonding agent is to be applied to a finished structure length of one cell wall and to be spaced apart with a finished structure length of one or three cell walls, what is meant, is that enough of the bonding agent is to be used that, when the honeycomb structure is completed, the amount of bonding agent used will have been just enough to bond adjacent sheets together at a width of one cell wall and to be spaced apart at a width of one or three cell walls. Because different bonding agents and sheet materials respond differently to each other, it is a matter of simple trial to estimate exactly how much bonding agent should be applied to yield a finished structure length of one cell wall.

A bonding agent can be any material that is used to bond or cause a bond between sheets of the honeycomb. Bonding agents may be, for example, thermoplastic or thermosetting resins, reactive polymers, oligomers or monomers, polymer solutions, polymer suspensions or emulsions, energy absorbing materials, and the like.

The sheet materials for use in practicing this invention can be any flexible sheet of adequate strength for an intended honeycomb purpose. The nature of the material can be plastic sheet or film, paper, nonwoven fabric, woven fabric, knitted fabric, or metal sheeting or foil, and the like. Specific materials can be aramid papers, including meta-aramids and para-aramids, fiberglass fabrics, aluminum foil, Kraft paper, polyimide and polyester films, and the like.

If it is necessary or preferable, based on the nature of the sheet material or the needs of the final honeycomb product, the collapsed stack can be sliced to the desired height prior to expansion. Additional process steps, such as, softening (plasticization) of the sheets before expansion, impregnation or coating of the sheets with resin before or after expansion, heat setting of the expanded honeycomb structure, and the like, may be conducted along with the process of the present invention.

To make the honeycomb structure of this invention, parallel lines of bonding agent are applied to a layer of sheet material in a spacing as shown in FIG. 2a to achieve a finished structure length of one cell wall length for the bonding agent and for the space between lines of bonding agent. This layer and bonding agent corresponds to layer 19 of FIG. 2a. Another layer of sheet material is placed on the first and, again, parallel lines of bonding agent are applied, but directly over (coincident with) alternating lines of bonding agent on the sheet below. This layer and bonding agent corresponds to layer 18 of FIG. 2a. These two steps of layer construction are then repeated as many times as required or desired for a particular honeycomb structure. Once the stack of sheets is complete, the bonding agent must be set to assure bonding between adjacent layers of the structure.

Setting the bonding agent can be accomplished by whatever means is appropriate for the particular bonding agent used. Thermoplastic and thermosetting resins are generally set by heat and/or pressure. Reactive resins are set by reaction with a reactive component—generally a fluid; but perhaps, also, some form of radiation, such as to accomplish cross-linking of the reactive resin. Polymer solutions are set by evaporation of solvent associated with the polymer. Energy absorbing materials are used to absorb some form of radiant energy to react with or melt the material of the honeycomb sheets—Ferrites or the like, can be used as an energy absorbing material to melt a meltable component in the honeycomb sheets using microwave radiation.

It should be pointed out that the bonding agent of this invention can be applied to one or both sides of any honeycomb sheet material; and, if applied to both sides, the corresponding areas of the adjacent sheet need not be coated. Also, the bonding agent can be applied to the sheets before the sheets are placed on the stack.

The process of this invention need not be conducted in the exact order of the steps set out above. For example, the layer of step (b) may be coated on both sides—on one side as prescribed in step (a) for contact with the layer of step (a) and on the other side for contact with the layer of step (c); or the layer of step (a) may be coated on only one side and the layer of step (d) may be coated on both sides—on one side for contact with the layer of step (b) and on the other side as prescribed in step (e) for contact with the next successive layer in the structure. So long as the bonding agent is properly located on the various layers in accordance with FIG. 2a before the bonding agent is set, the process of this invention is being practiced.

The resulting honeycomb structure of this invention is collapsed and must, ultimately, be expanded to yield a structure of six-sided cells. The process of this invention may also include steps of setting the bonding agent to bond the layers of sheet material together and pulling the bonded sheets apart in directions perpendicular to the plane of the sheets whereby the honeycomb cells of the honeycomb structure are expanded such that the six cell walls each form one side of a hexagon. In the expanded configuration, the sheets of the honeycomb structure are, in many cases, impregnated with a resin to rigidify and stabilize the honeycomb cells. The independent, multiple, cell walls of this invention permit faster and more complete resin impregnation by virtue of their lesser thickness and may, in some cases, permit greater resin pickup.

The impregnating resin can be any material usually used for this purpose including thermoplastic or thermosetting solutions, emulsions, reactive systems, and the like. The impregnation can be accomplished by immersion, coating, spraying, and the like; and, once impregnated, the resin can be hardened in whatever manner is appropriate for the resin system chosen.

TEST METHODS

Thickness of sheets and stacks was determined by measuring the thickness of a sample of the test material in accordance with ASTM D 645.

Density of the expanded honeycomb core was determined in accordance with procedures and calculations set out in ASTM C 271-61.

Stabilized or Flatwise Compressive Strength and Modulus of the core were determined on an Instron-type testing machine based on the procedure from ASTM C 365-57.

"L" and "W" Plate Shear Strength and Modulus of the core were determined on an Instron-type testing machine in accordance with procedures and calculations set out in ASTM C 273-61.

In the examples below, Example 1 demonstrates a process in accordance with this invention to make the honeycomb structure of this invention.

Example 2 demonstrates, on small model samples, the reduction of the force necessary to expand the core for the present invention as compared with a conventional method of honeycomb manufacture. For the same final configuration and the same size of structure, the method in accordance with the invention required an expansion force of only 419 g compared with 609 g for the conventional method—a reduction of more than 30 percent.

EXAMPLE 1

An aramid paper having a basis weight of 27.8 g/m$^2$ (0.82 oz/yd$^2$) and thickness of 37.6 micrometers (1.48 mils) and consisting of 67 wt. % para-aramid floc and 33 wt. % meta-aramid fibrids, was used as a beginning sheet material. The meta-aramid fibrids were made from poly (metaphenylene isophthalamide) as described in U.S. Pat. No. 3,756,908. The para-aramid floc was floc made from poly(para-phenylene terephthalamide) having a linear density of 1.6 dtex (1.42 denier) and a length of 6.4 mm (sold by E. I. du Pont de Nemours and Company under the tradename KEVLAR®49).

Lines of bonding agent were printed on the paper using a laboratory gravure coater. Two different printing rolls were used, with the distance between lines of 6.35 mm (0.25 in.) and 12.7 mm (0.5 in.), respectively, for different sheets of the paper. The bonding agent was obtained from Marshall Consulting Co. as MC-3 node line adhesive.

The printed sheets were stacked in such order that each second sheet in the stack had the lines of greater spacing (12.7 mm). The stack of sheets had bonding agent printing in accordance with FIG. 2a.

Sheets of the stack were bonded together in a press at 81 C for 45 minutes. The stack of sheets was expanded by pulling the bonded sheets apart in directions perpendicular to the plane of the sheets and the stack was then heat-set at 270° C. for 10 minutes.

Later, the expanded stack was dipped in a solution of phenolic resin ("Oxychem 23169" obtained from oxychem Co.) and dried and cured at about 180° C.

The product was a honeycomb structure of cell walls with 6.35 mm (0.25 in.) sides and a density of about 54 kg/m$^3$ (2.8 lb/ft$^3$). Mechanical properties of the structure were as follows: stabilized compressive strength 1.32 Mpa (191 psi), stabilized compressive modulus 124 Mpa (18 kpsi), "L" plate shear strength 1.21 Mpa (175 psi), "L" plate shear modulus 117 MPa (17 kpsi), "W" plate shear strength 0.50 Mpa (72 psi), and "W" plate shear modulus 2.4 Mpa (3.6 kpsi).

EXAMPLE 2

This example was a test of the force required to expand a collapsed honeycomb structure.

Recycled cellulose paper 0.3 millimeters thick was used as a the sheet material for this example.

Eight 1.90 cm (0.75 inch) wide and 22.86 cm (9 inches) long strips of the paper were cut and 2.54 cm (1 inch) wide bonding agent lines were created manually. The strips were combined together in accordance with FIG. 2a. A urethane-based material supplied by Power Poxy Adhesives, Inc. was used as the bonding agent.

The bonding agent was cured at room temperature for 24 hours, and loops of a woven fabric (Kevlar® brand aramid fabric, Style 708 produced by Clark-Schwebel) were attached to the center segments of the outer plies of the collapsed honeycomb structure, using the same bonding agent, to be used as gripping points for expanding the honeycomb.

After final curing, the loops were placed in the grips of an Instron 1122 and the collapsed honeycomb structure was expanded at a rate of 5.06 cm/min (2 in/min) to its complete opening (full expansion of two central cells). The maximum force during the expansion of this structure was 419 g (0.923 lb.).

As a comparison, eight strips of the same paper as used above were cut as described above.

The eight strips were laminated into four two-ply strips using about 5 wt % (based on weight of the paper) of the same bonding agent. The bonding agent filled the porous structure of the paper surface only, and the four final strips had double the initial thickness of the paper (0.6 millimeters) without any addition from the bonding agent.

2.54 cm (1 inch) wide bonding agent lines were created manually with the same bonding agent and four laminated strips were combined together in accordance with FIG. 1a.

As before, the bonding agent was cured, loops of woven fabric were attached to center segments of the outer plies, that bonding agent was cured, and the collapsed honeycomb structure was expanded, all under the same conditions and at the same rate as described earlier.

The maximum force during the expansion of this structure was 609 g (1.34 lb.).

What is claimed is:

1. A honeycomb structure comprising a multitude of honeycomb cells with each cell having six cell walls of subsequently equal cell wall length and each cell wall comprising at least two layers of sheet material wherein the sheet material of all of the layers of two opposite walls of each cell are bonded to each other and to walls of other cells and none of the layers of the remaining four walls of each cell are adhered together or to walls of other cells with the proviso that the remaining four walls of each cell contact cell walls of adjacent honeycomb structures.

2. The honeycomb structure of claim 1 wherein the sheet material is aramid paper.

3. The honeycomb structure of claim 1 wherein each cell wall has two layers of sheet material.

4. The honeycomb structure of claim 1 wherein the multitude of honeycomb cells is collapsed.

5. A process for making a honeycomb structure having a multitude of honeycomb cells with each cell having six cell walls of substantially equal cell wall length and each cell wall comprising at least two layers of sheet material comprising the steps of:

(a) applying lines of bonding agent to one layer of sheet material such that the lines are parallel with a finished structure length of one cell wall length and are spaced apart with a finished structure length of one cell wall length between lines of bonding agent;

(b) placing a layer of sheet material on the sheet material of step (a);

(c) applying lines of bonding agent to the layer of step (b) such that the lines are parallel with a finished structure length of one cell wall length, are spaced apart with a finished structure length of three cell wall lengths between lines of bonding agent, and are located directly coincident with lines of bonding agent on the sheet material of step (a);

(d) placing a layer of sheet material on the sheet material of step (c);

(e) applying lines of bonding agent to the layer of step (d) such that the lines are parallel with a finished structure length of one cell wall length, are spaced apart with a finished structure length of one cell wall length between lines of bonding agent, and, at least some, are located directly coincident with lines of bonding agent on the sheet material of step (c).

6. The process of claim 5 wherein the sheet material is aramid paper.

7. The process of claim 5 further comprising the steps of:

(f) setting the bonding agent to bond the layers of sheet material together;

(g) pulling the bonded sheets apart in directions perpendicular to the plane of the sheets;

whereby the honeycomb cells of the honeycomb structure are expanded such that the six cell walls each form one side of a hexagon.

8. The process of claim 5 wherein applying lines of bonding agent in step (a) is accomplished by applying lines of bonding agent to both sides of the layer of step (b)—on one side as prescribed in step (a) for contact with the layer of step (a) and on the other side as prescribed in step (c) for contact with the layer of step (d).

9. The process of claim 8 further comprising the steps of:

(f) setting the bonding agent to bond the layers of sheet material together;

(g) pulling the bonded sheets apart in directions perpendicular to the plane of the sheets;

whereby the honeycomb cells of the honeycomb structure are expanded such that the six cell walls each form one side of a hexagon.

10. The process of claim 5 wherein applying lines of bonding agent in step (c) is accomplished by applying lines of bonding agent to both sides of the layer of step (d)—on one side as prescribed in step (c) for contact with the layer of step (b) and on the other side as prescribed in step (e).

11. The process of claim 10 further comprising the steps of:

(f) setting the bonding agent to bond the layers of sheet material together;

(g) pulling the bonded sheets apart in directions perpendicular to the plane of the sheets;

whereby the honeycomb cells of the honeycomb structure are expanded such that the six cell walls each form one side of a hexagon.

\* \* \* \* \*